United States Patent
Das et al.

(10) Patent No.: US 10,474,551 B2
(45) Date of Patent: Nov. 12, 2019

(54) METHOD AND SYSTEM FOR RECOVERING DATA FROM STORAGE SYSTEMS

(71) Applicant: WIPRO LIMITED, Bangalore (IN)

(72) Inventors: Rishav Das, Howrah (IN); Sourav Mudi, Burdwan (IN)

(73) Assignee: Wipro Limited, Bangalore (IN)

( * ) Notice: Subject to any disclaimer, the term of this patent is extended or adjusted under 35 U.S.C. 154(b) by 110 days.

(21) Appl. No.: 15/681,612

(22) Filed: Aug. 21, 2017

(65) Prior Publication Data
US 2019/0004911 A1  Jan. 3, 2019

(30) Foreign Application Priority Data
Jun. 30, 2017 (IN) .............................. 201741023081

(51) Int. Cl.
*G06F 11/20* (2006.01)
*G06F 11/16* (2006.01)
*G06F 11/00* (2006.01)

(52) U.S. Cl.
CPC ........ *G06F 11/2094* (2013.01); *G06F 11/004* (2013.01); *G06F 11/1666* (2013.01); *G06F 2201/805* (2013.01)

(58) Field of Classification Search
CPC .......................... G06F 11/1666; G06F 11/2094
See application file for complete search history.

(56) References Cited

U.S. PATENT DOCUMENTS

| 5,371,882 | A | * | 12/1994 | Ludlam | G06F 11/2094 714/6.32 |
|---|---|---|---|---|---|
| 7,770,055 | B2 | | 8/2010 | Khurana et al. | |
| 9,189,309 | B1 | * | 11/2015 | Ma | G06F 11/3034 |
| 9,542,296 | B1 | * | 1/2017 | Engers | G06F 11/3452 |
| 2005/0060618 | A1 | * | 3/2005 | Guha | G06F 11/008 714/54 |
| 2007/0079170 | A1 | * | 4/2007 | Zimmer | G06F 11/008 714/6.23 |
| 2007/0171562 | A1 | * | 7/2007 | Maejima | G06F 11/1662 360/69 |
| 2008/0183987 | A1 | * | 7/2008 | Ito | G06F 11/004 711/161 |

(Continued)

FOREIGN PATENT DOCUMENTS

CN        104268038        1/2015

*Primary Examiner* — Yolanda L Wilson
(74) *Attorney, Agent, or Firm* — Finnegan, Henderson, Farabow, Garrett & Dunner, LLP

(57) ABSTRACT

A method and system for recovering data from a storage system is disclosed. The method includes predicting, by a fault tolerance device, a fault within the storage system comprising one or more disk array enclosures, wherein each of the one or more disk array enclosures comprise a plurality of disks. The method further includes identifying, by the fault tolerance device, a data block going to be affected by occurrence of the predicted fault, wherein the data block is identified within a first disk in the plurality of disks. The method includes extracting, by the fault tolerance device, data stored in the data block before occurrence of the predicted fault. The method further includes transferring, by the fault tolerance device, the data extracted from the data block to a second disk not going to be affected by occurrence of the predicted fault.

18 Claims, 7 Drawing Sheets

(56) References Cited

U.S. PATENT DOCUMENTS

| | | | | |
|---|---|---|---|---|
| 2009/0271657 A1* | 10/2009 | McCombs | ............ | G06F 11/004 |
| | | | | 714/6.2 |
| 2014/0019813 A1* | 1/2014 | McLean | ................ | G06F 11/008 |
| | | | | 714/47.3 |
| 2015/0234719 A1* | 8/2015 | Coronado | ............ | G06F 11/203 |
| | | | | 714/6.3 |
| 2015/0286531 A1* | 10/2015 | Bondurant | ............. | G11B 5/012 |
| | | | | 714/6.23 |
| 2016/0070628 A1* | 3/2016 | Joshi | .................. | G06F 11/2094 |
| | | | | 714/6.22 |
| 2016/0154718 A1* | 6/2016 | Chadwell | ............ | G06F 11/1092 |
| | | | | 714/6.22 |
| 2016/0239397 A1* | 8/2016 | Thomas | .............. | G06F 11/2094 |

\* cited by examiner

METHOD AND SYSTEM FOR RECOVERING DATA FROM STORAGE SYSTEMS

TECHNICAL FIELD

This disclosure relates generally to storage systems and more particularly to method and system for recovering data from storage systems.

BACKGROUND

Storage systems are subject to loss of stored data because of hardware or software failures. In order to protect and restore data in the event of a failure, storage systems utilize conventional techniques, such as, Redundant Array of Independent Disks (RAID) or Just a Bunch Of Disks (JBOD). However, in such conventional techniques, high data spaces and data protection is required for data restoration, when the degree of failure is high. By way of an example, a cluster in a storage system under RAID protection of 10 TB has only 5 TB usable space. Rest half of the total space is reserved for data protection in order to duplicate or mirror the data in the used space for backup or recovery, during failure. Moreover, these conventional techniques are not time efficient, as huge amount of data is consumed to recover data from disk array enclosures. The latency time increases rapidly when the data is dumped into parity drives. As a result, the customer has to keep on increasing the space for storing new sets of data, which is not a cost efficient method for customers, especially, Online Transaction Processing (OLTP)/A1 customers.

In some configurations, these conventional techniques can sustain up to two to three disk (or drive) failures. Beyond this, a cluster within the storage system or the whole storage system enters into the shutdown mode. As a result, the cluster reaches a data loss state, thereby interrupting customer services. Therefore, at least for the reasons cited above, such techniques are not efficient or robust for handling data for very large enterprise that operate round the clock.

SUMMARY

In one embodiment, a method of recovering data from a storage system is disclosed. The method includes predicting, by a fault tolerance device, a fault within the storage system comprising one or more disk array enclosures, wherein each of the one or more disk array enclosures comprise a plurality of disks. The method further includes identifying, by the fault tolerance device, a data block going to be affected by occurrence of the predicted fault, wherein the data block is identified within a first disk in the plurality of disks. The method includes extracting, by the fault tolerance device, data stored in the data block before occurrence of the predicted fault. The method further includes transferring, by the fault tolerance device, the data extracted from the data block to a second disk not going to be affected by occurrence of the predicted fault.

In another embodiment, a storage system is disclosed. The storage system includes one or more disk array enclosures, wherein each of the one or more disk array enclosures comprises a plurality of disks. The storage device further includes at least one controller communicatively coupled to the one or more disk array enclosures. The at least one controller is configured to predict a fault within the storage system comprising one or more disk array enclosures, wherein each of the one or more disk array enclosures comprise a plurality of disks. The at least one controller is further configured to identify a data block going to be affected by occurrence of the predicted fault, wherein the data block is identified within a first disk in the plurality of disks. The at least one controller is configured to extract data stored in the data block before occurrence of the predicted fault. The at least one controller is further configured to transfer the data extracted from the data block to a second disk not going to be affected by occurrence of the predicted fault.

In yet another embodiment, a management server for recovering data in a storage system is disclosed. The management server includes a processor and a memory communicatively coupled to the processor and having instructions stored thereon, causing the processor, on execution to a memory communicatively coupled to the processor and having instructions stored thereon, causing the processor, on execution to predict a fault within the storage system comprising one or more disk array enclosures, wherein each of the one or more disk array enclosures comprise a plurality of disks; identify a data block going to be affected by occurrence of the predicted fault, wherein the data block is identified within a first disk in the plurality of disks; extract data stored in the data block before occurrence of the predicted fault; and transfer the data extracted from the data block to a second disk not going to be affected by occurrence of the predicted fault.

In another embodiment, a non-transitory computer-readable storage medium is disclosed. The non-transitory computer-readable storage medium has Instructions stored thereon, a set of computer-executable instructions causing a storage device that includes one or more processors to perform steps including predicting a fault within the storage system comprising one or more disk array enclosures, wherein each of the one or more disk array enclosures comprise a plurality of disks; identifying a data block going to be affected by occurrence of the predicted fault, wherein the data block is identified within a first disk in the plurality of disks; extracting data stored in the data block before occurrence of the predicted fault; and transferring the data extracted from the data block to a second disk not going to be affected by occurrence of the predicted fault.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
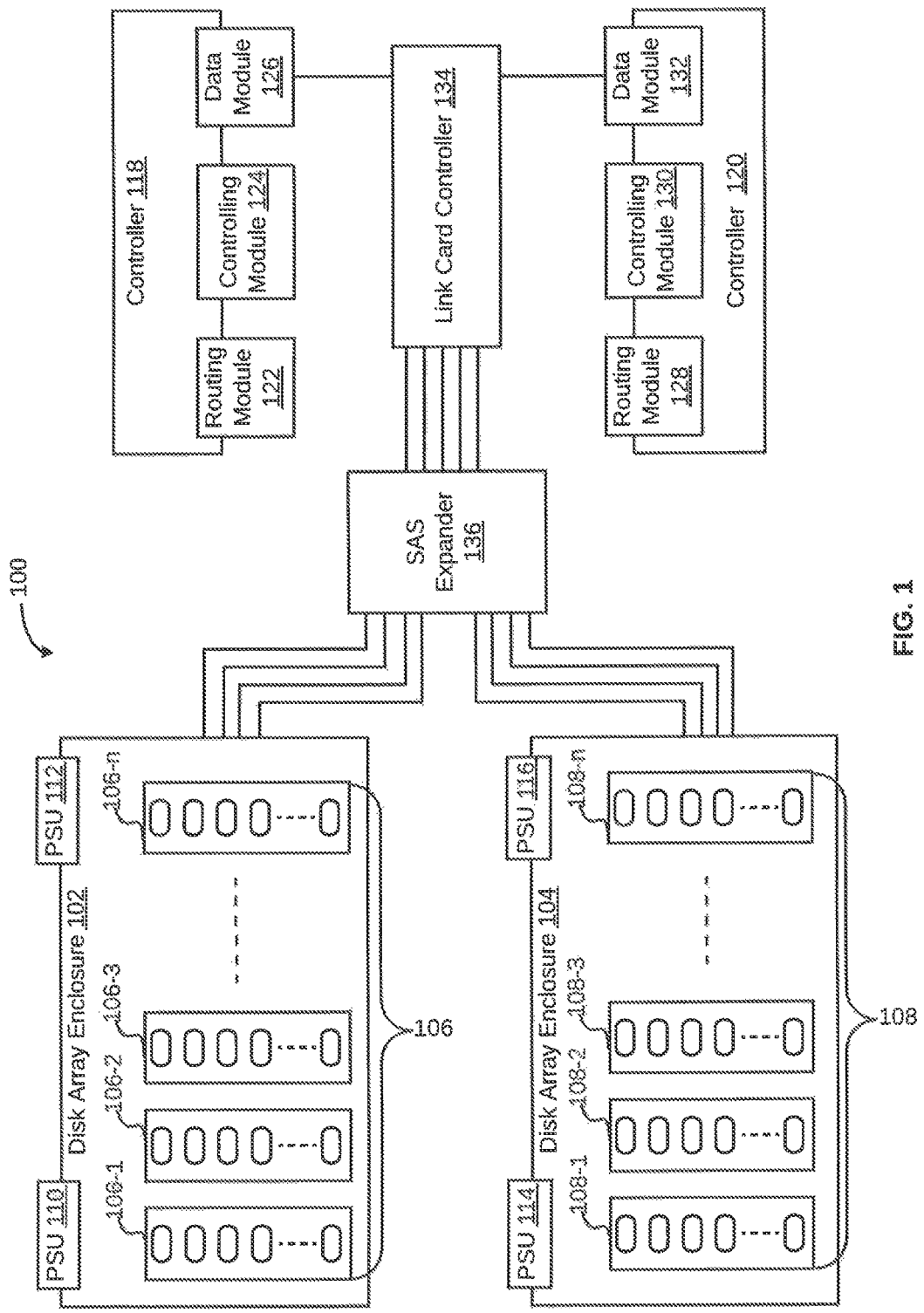
FIG. 1 is a block diagram illustrating a storage system, in which various embodiments may be employed.

Additional illustrative embodiments are listed below. In one embodiment, a storage system 100 in which various embodiment may be employed is illustrated in FIG. 1. Storage system 100 includes two clusters, such that, a first cluster includes a disk array enclosure 102 and a second cluster includes a disk array enclosure 104. It will be apparent to a person skilled in the art that storage system 100 may include only one cluster that includes both disk array enclosures 102 and 104.

Disk array enclosure 102 includes a plurality of disks, i.e., a disk 106-1 to a disk 106-n, collectively referred to as disk array 106. The value of n, for example, may be 25. In other words, disk array enclosure 102 may include twenty-five disks. Each disk in disk array 106 includes a plurality of data blocks, which are the basic erasable storage units in a disk. A disk may either be a Solid State Drive (SSD) or a Hard Disk Drive (HDD). In a similar manner, disk array enclosure 104 includes a plurality of disks, i.e., a disk 108-1 to a disk 108-n, collectively referred to as disk array 108. By way of an example, disk array enclosure 102 includes twenty-five SDD disks. Each SDD disk includes multiple data blocks and storage capacity of a data block may vary from 64 kb to 4 mb.

Each of disk array enclosures 102 and 104 further include one or more Power Supply units (PSUs) that ensure power supply to each disk in an associated disk array enclosure for their uninterrupted functioning. Disk array enclosure 102 includes a PSU 110 and a PSU 112. PSU 110 may supply power to a set of disks within disk array 106 and PSU 112 may supply power to a remaining set of disks within disk array 106. Alternatively, at a given time, only one of PSU 110 and PSU 112 may control power supply to disk array 106 and the other may act as backup in case of malfunctioning of the currently serving PSU. In a similar manner, disk array enclosure 104 includes a PSU 112 and a PSU 114.

The operations of read/write and erasure of data from disk array enclosure 102 may be managed by one or more of a controller 118 and a controller 120. Disk array enclosure 102, which includes PSU 110 and PSU 112, controller 118, and controller 120 collectively form the first cluster. In the current arrangement shown in FIG. 1, controller 118 may manage the above discussed operations and controller 120 acts as a backup, in case controller 118 malfunctions. In an alternative arrangement, both controller 118 and controller 120 may work in conjunction to manage these operations. In a similar manner, disk array enclosure 104 may be managed by one on more controllers (not shown in FIG. 1). It will be apparent to a person skilled in the art that one cluster may include more than one disk array enclosure that are all in communication with only a single controller or each disk array enclosure is separately in communication with at least one dedicated controller.

Each of controller 118 include a routing module 122, a controlling module 124, and a data module 126 that enable controller 118 to manage the data read/write and erasure operations. Data module 126 extracts data from one or more disks in disk array enclosure 102 and routes the data to controlling module 124, which identifies and discards redundant parts within the extracted data. The non-redundant data is then forwarded to routing module 128, which breaks down the non-redundant data into blocks of predefined size (for example, 4 kb), before routing it to a desired location. In a similar manner, controller 120 includes a routing module 128, a controlling module 130, and a data module 132.

Controller 118 and controller 120 are communicatively coupled to disk array enclosure 102 through a link card controller 134 and a Serial Attached SCSI (SAS) expander 136. SAS expander 136 enables each of controller 118 and controller 120, via link card controller 134, to communicate with a greater number of disks than they are physically configured to. By way of an example, controller 118 may be physically configured to communicate with four to eight disks, however, SAS expander 136 may enable controller 118 to communicate with up to 256 disk.

Figure 2:
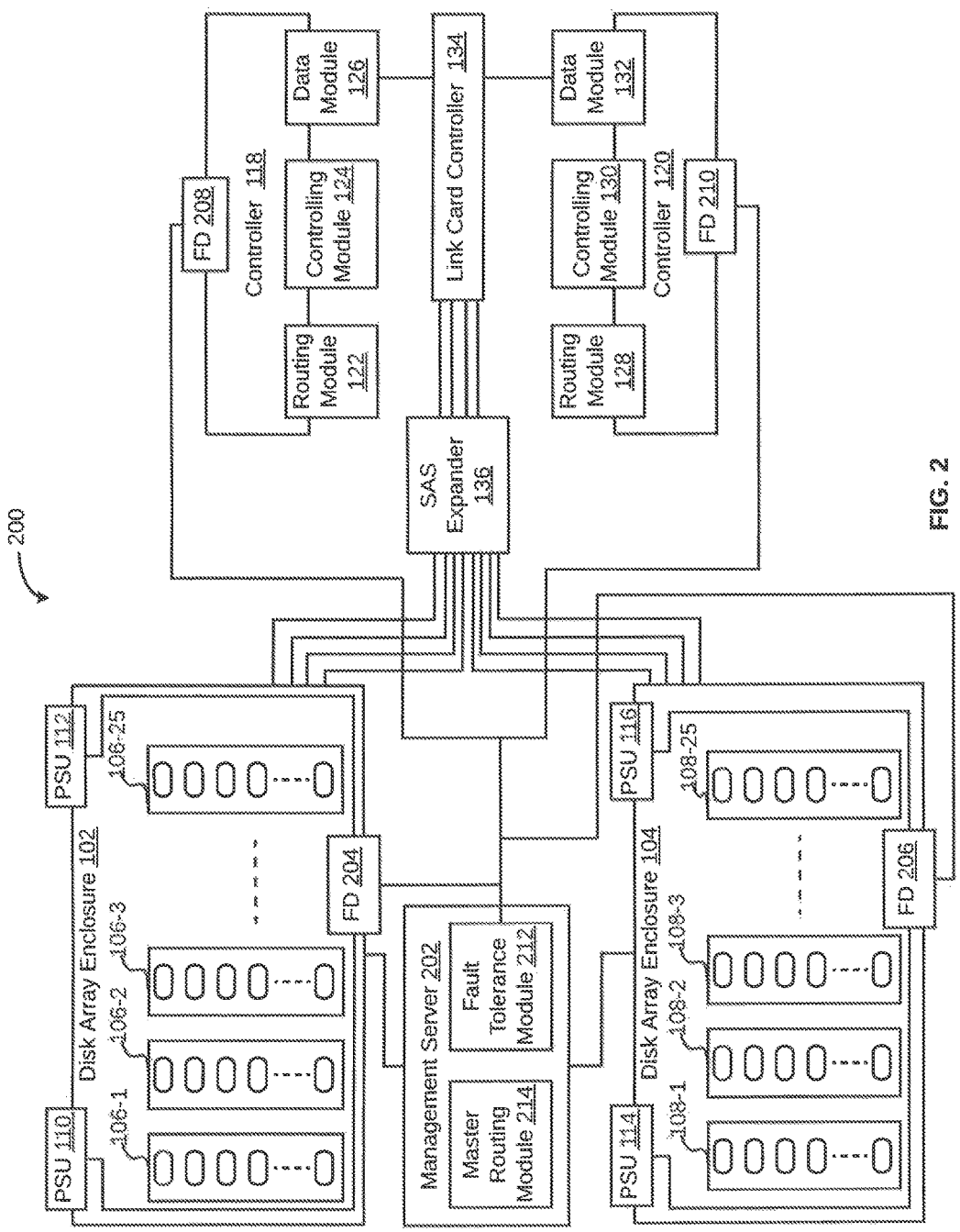
FIG. 2 is a block diagram illustrating a storage system comprising a management server and a plurality of fault detectors, in accordance with an embodiment.

Referring now to FIG. 2, a storage system 200 that includes a management server 202 and a plurality of Fault Detectors (FDs) is illustrated, in accordance with an embodiment. Management server 202 facilitates transfer of data amongst disks within storage system 200. Each of the plurality of FDs may be a relay circuit that detects a fault occurrence signal and based on that predicts occurrence of a fault in storage system 200 within next milliseconds. Examples of faults may include power failure, software failure, or any other hardware failure. The plurality of FDs includes an FD 204 that is associated with disk array enclosure 102 and is communicatively coupled to PSU 110 and PSU 112. When there is a failure or a fault in one or more of PSU 110 and PSU 112, a fault occurrence signal is detected by FD 204. This enables FD 204 to predict occurrence of a fault in disk array enclosure 102. Similarly, the plurality of FDs include an FD 206 associated with disk array enclosure 104, which is communicatively coupled to each of PSU 114 and PSU 116. In addition to FDs 204 and 206 associated with disk array enclosures 102 and 104, the plurality of FDs includes an FD 208 associated with controller 118 and an FD 210 associated with controller 120. It will be apparent to a person skilled in the art that storage system 200 may include additional FDs based on the number of other components (not shown in FIG. 2) that have high fault vulnerability within storage system 200. In order to detect a fault, each FD remains in a beacon mode that constantly checks for fault occurrence in an associated component.

Each of the plurality of FDs are communicatively coupled to a fault tolerance module 212 within management server 202. When a FD detects a fault occurrence signal in an associated component, the FD relays the fault tolerance signal to fault tolerance module 212 in order to inform fault tolerance module 212 regarding occurrence of the fault. In other words, an FD after detecting a fault, instantly triggers fault tolerance module 212. Fault tolerance module 212 then determines location of the fault and also identifies the components within storage system 200 that might get affected by occurrence of the fault. In an embodiment, when FD 204 or FD 206 (associated with a disk array enclosure)

detect a fault, they trigger fault tolerance module 212, which further triggers controller 118 or controller 120, via FD 208 or FD 210 respectively.

By way of an example, PSU 110 may fail due to power fluctuation. This fault is immediately detected by FD 204 based on a fault occurrence signal received from PSU 110. FD 204 instantly relays the fault occurrence signal to fault tolerance module 212. Based on the fault occurrence signal, fault tolerance module 212 predicts that a power failure may occur in PSU 110. Thereafter, fault tolerance module 212 also identifies one or more data blocks in one or more first disks within disk array enclosure 102 that are going to be affected by occurrence of the power failure. Fault tolerance module 212 then determines address of the one or more data blocks in the one or more first disks and instructs controller 118, via FD 208, to extract data from the one or more data blocks in the one or more first disks, before occurrence of the fault. After data extraction, controller 118 transfers the extracted data to one or more data blocks within one or more second disks that are not going to be affected by occurrence of the fault. Fault tolerance module 212 is further explained in detail in conjunction with FIG. 3.

The one or more first disks may be located within a first disk array enclosure that is going to be affected in its entirety by occurrence of the fault. In this case, the extracted data is routed through a master routing module 214 in management server 202 to one or more second disks located within a second disk array enclosure. In continuation of the example above, if fault tolerance module 212 detects that disk array enclosure 102 is completely affected by a fault that may occur in PSU 110, controller 118 may extract data from disk array enclosure 102 and transfer it to disk array enclosure 104, via master routing module 214. This is depicted in detail in conjunction with FIG. 4. In an embodiment, fault tolerance module 212 may be located outside management server 202. In this case, when management server 202 is not capable of transferring data, fault tolerance module 212 may facilitate the transfer of data based on injection of one or more services of master routing module 214 in management server 202.

Figure 3:
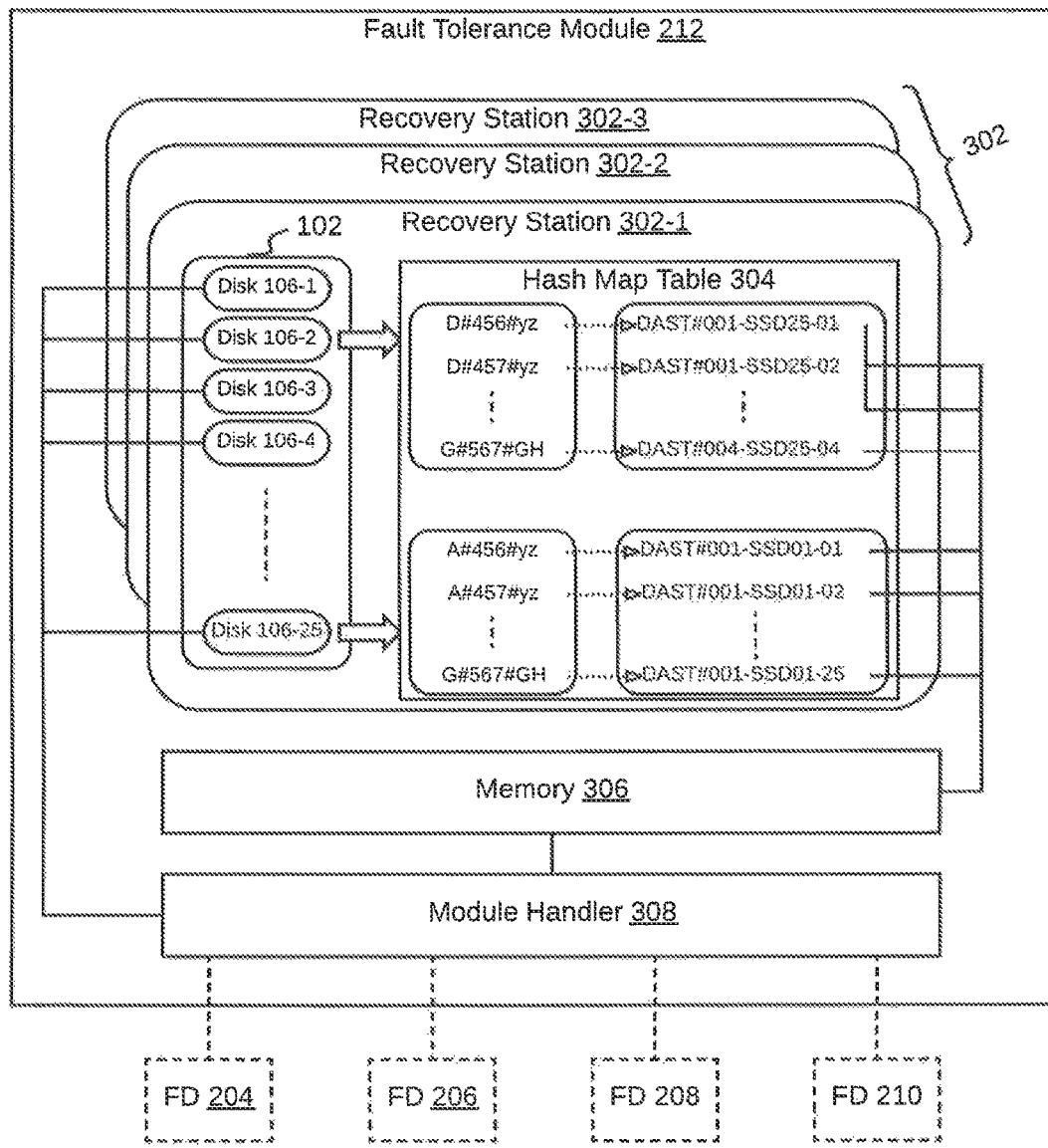
FIG. 3 is a block diagram illustrating various modules within a fault tolerance module of a storage system, in accordance with an embodiment.

Referring now to FIG. 3, a block diagram of various modules within fault tolerance module 212 of storage system 200 is illustrated, in accordance with an embodiment. Fault tolerance module 212 may either be implemented as a software installed within management server 202 or as a separate device that is in communication with management server 202. In this embodiment, we consider that storage system 200 includes three clusters. Thus, fault tolerance module 212 includes three recovery stations, such that, one recovery station corresponds to one cluster in storage system 200. A set of recovery stations 302 that corresponds to storage system 200 is depicted in FIG. 3. As storage system 200 includes three disk clusters, set of recovery stations 302 also includes three recovery stations, i.e., a recovery station 302-1, a recovery station 302-2, and a recovery station 302-3. For illustrative purpose, only recovery station 302-1 that corresponds to disk array enclosure 102, which includes 25 disks is further discussed in detail.

Recovery station 302-1 has a hash map table 304 associated with disk array 106. Hash map table 304 includes address mapping for each data block in each disk of disk array 106. In the address mapping for a data block, a virtual hash address for the data block is mapped to an actual memory address of the data block within a disk, along with identification of each of: the disk, a disk array enclosure (i.e., disk array enclosure 102 in this case) that includes the disk, and a cluster that includes the disk array enclosure. This is depicted in hash map table 304. Similar to hash map table 304, each of recovery station 302-2 and 302-3 would have an associated hash map table (not shown in FIG. 3). Alternatively, a single hash map table may be stored for the whole storage system 200, rather than, storing separate hash map table for each disk or each disk array enclosure. The plurality of recovery stations and associated hash tables may be stored in a memory 306 of fault tolerance module 212. Memory 306 may be part of an internal memory in management server 202. Memory 306 may additionally store logs extracted from an affected disk array enclosure or cluster. These stored logs may be used for future investigations.

Fault tolerance module 212 further includes a module handler 308 that is communicatively coupled to memory 306. When fault tolerance module 212 receives a fault occurrence signal from an FD (for example, FD 204), module handler 308 uses a DASH 4.0 algorithm to determine a type of the fault and services (currently available to customers) that may be interrupted as a result of occurrence of the fault. Thereafter, based on the hash map tables stored in memory 306, module handler 308 identifies specific disks and one or more data blocks within these disks that may be affected by occurrence of the fault. By way of an example, FD 204 detects occurrence of a fault in PSU 110 and relays this information to module handler 308. Thereafter, module handler 308 accesses hash map table 304 to identify data blocks within one or more disks of disk array 106. This information is then shared with controller 118, which extracts data from the identified data blocks and transfers the extracted data to one or more data blocks that are not going to be affected by occurrence of the fault.

Transfer of extracted data from the identified data blocks to the one or more data blocks may be facilitated by master routing module 214 in management sever 202. In an embodiment, when two or more disks are predicted to be affected or impacted as a result of occurrence of a fault, data stored in the these two or more disks is transferred to a peer disk within the same disk array enclosure and thus the same cluster. By way of an example, based on a fault detected by FD 204, it may be predicted that disk 106-1 and disk 106-2 will both be affected by occurrence of the fault. In this case, data stored in each of disk 106-1 and disk 106-2 may be transferred to either of remaining disks in disk array 106.

In another embodiment, when a cluster includes two or more disk array enclosures and one of these disk array enclosures is going to be affected in its entirety by occurrence of the fault, then data stored in that disk array enclosure is transferred to another disk array enclosure that won't be affected by occurrence of the fault within the cluster, by master routing module 214. However, in this case, if a cluster includes only one disk array enclosure, then data stored in a disk array enclosure that is going to be affected by occurrence of the fault is transferred to another disk array enclosure in a different cluster by master routing module 214. By way of an example, the first cluster discussed in FIG. 1, only includes disk array enclosure 102, as disk array enclosure 104 is part of the second cluster. Thus, when fault tolerance module 212 determines that disk array enclosure 102 would be affected in its entirety by occurrence of a fault, master routing module 214 enables transfer of data from disk array enclosure 102 to disk array enclosure 104 (located within a different cluster). This is further explained in detail in conjunction with FIG. 4.

Figure 4:
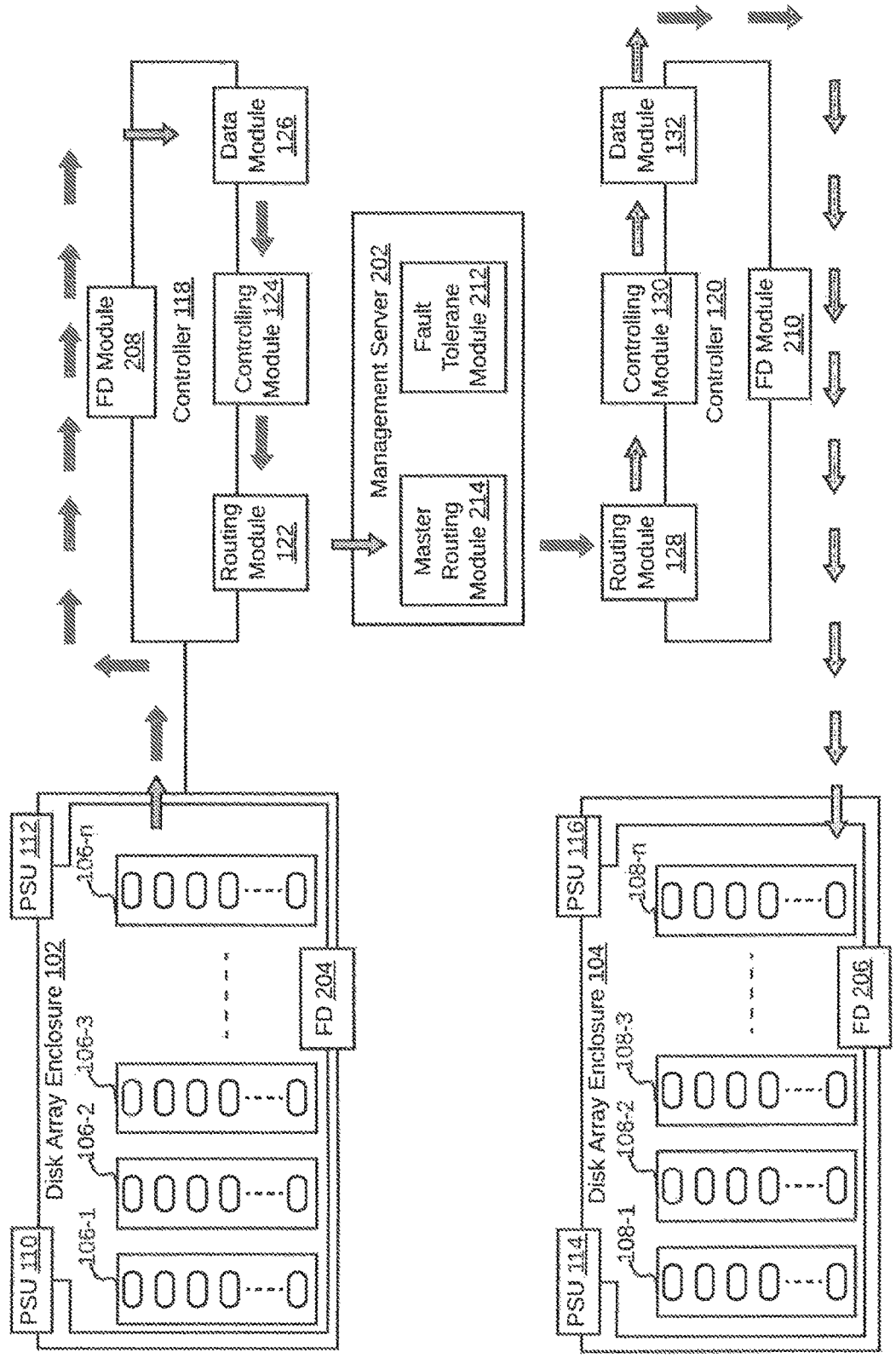
FIG. 4 illustrates transfer of data extracted from a disk array enclosure in a first cluster to a disk array enclosure in a second cluster of a storage system by a management server is illustrated, in accordance with an embodiment.

Referring now to FIG. 4, transfer of data extracted from disk array. enclosure 102 in the first cluster to disk array enclosure 104 in the second cluster by management server 202 is illustrated, in accordance with an exemplary embodiment. It will be apparent to a person skilled in the art that interconnections between various components are not shown in order to clearly depict the transfer of data. As discussed in FIG. 1, disk array enclosure 102 is part of the first cluster and disk array enclosure 104 is part of the second cluster in storage system 200. When FD 204 detects a fault occurrence signal from PSU 110, FD 204 relays it to fault tolerance module 212. Based on the fault occurrence signal, fault tolerance module 212 predicts that disk array enclosure 102 is going to be affected in its entirety by occurrence of the fault. Fault tolerance module 212 also retrieves address of each data block within disk array 106 of disk array enclosure 102. This has been explained in detail in conjunction with FIG. 3.

Fault tolerance module 212 then instructs controller 118 (in communication with disk array enclosure 102), via FD 208, to extract data stored in disk array 106 before occurrence of the fault. Fault tolerance module 212 also shares address of each data block within disk array 106 from which data is required to be extracted. Data module 126 processes the instructions received from fault tolerance module 212 and starts extracting data from each data block within disk array 106 before occurrence of the fault. The extracted data is then transferred to controlling module 124, which determines redundant data and discards it. The non-redundant data is transferred to routing module 122, which breaks down the extracted data into blocks of a predefined size (for example, 4 kb) and forwards these blocks of data to master routing module 214.

Master routing module 214 communicates with fault tolerance module 212 to determine availability of parity drives in disk array enclosure 104 for dumping the extracted data. Accordingly, master routing module 214 directly routes the extracted data to these parity disks, via routing module 128, controlling module 130, and data module 132, to disk array enclosure 104 (in the second cluster). However, when most of the storage infrastructure in storage system 200 is affected, master routing module 214 temporarily stores the extracted data received from routing module 122 in a memory (for example, memory 306) of management server 202. In this case, after the fault has occurred, master routing module 214 determines which parity disks are available in disk array enclosure 102 or disk array enclosure 104 for storing the data extracted and temporarily stored in the memory of management server 202. As a result, data stored in storage system 200 is saved from being lost or damaged as a result of a power failure or a hardware failure.

Figure 5:
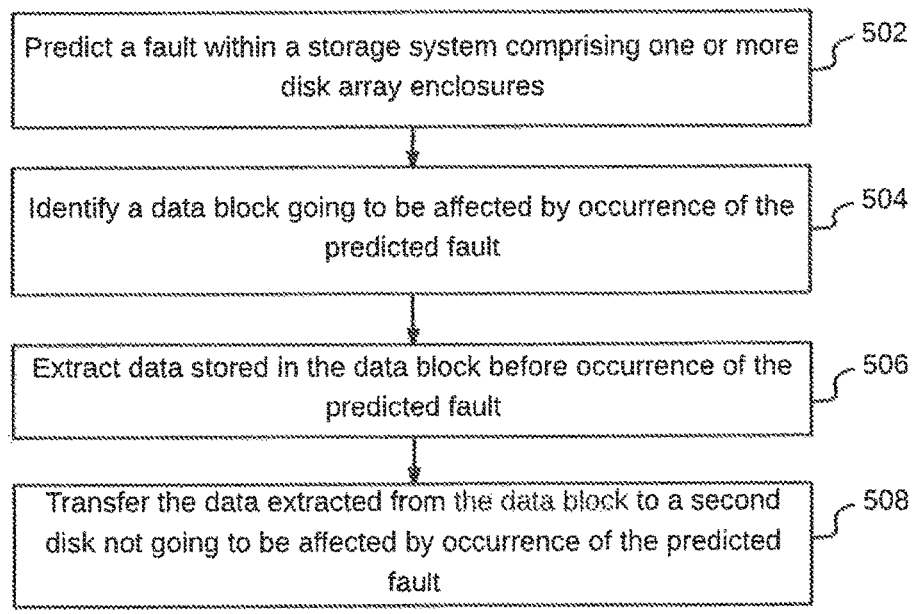
FIG. 5 illustrates a flowchart of a method of recovering data from a storage system, in accordance with an embodiment.

Referring now to FIG. 5, a flowchart of a method of recovering data from storage system 200 is Illustrated, in accordance with an embodiment. At step 502, a fault is predicted within storage system 200. Storage system 200 includes two disk array enclosures 102 and 104 that further include a plurality of disks, i.e., disk array 106 and disk array 108. The fault may be predicted by fault tolerance module 212, after a fault occurrence signal is detected by an FD (for example, FD 204). Thereafter, a data block that is going to be affected by occurrence of the predicted fault is identified at step 504. The data block may be identified within a first disk in the plurality of disks. In an embodiment, multiple data blocks may be identified within two or more first disks that are going to be affected by occurrence of the fault. The data block may be identified by fault tolerance module 212. This has already been explained in detail in conjunction with FIG. 2 and FIG. 3.

At step 506, data stored in the identified data block is extracted before occurrence of the predicted fault. At step 508, the data extracted from the data block is transferred to a second disk that is not going to be affected by occurrence of the predicted fault. In an embodiment, when two or more disks are predicted to be affected or impacted as a result of occurrence of a fault, data stored in data blocks of these two or more disks is transferred to a peer disk within the same disk array enclosure and thus the same cluster. In another embodiment, when a cluster includes two or more disk array enclosures and one of these disk array enclosures is going to be affected in its entirety by occurrence of the fault, then data stored in data blocks of that disk array enclosure is transferred to another disk array enclosure that won't be affected by occurrence of the fault within the cluster. However, in this case, if a cluster includes only one disk array enclosure, then data stored in data blocks of a disk array enclosure that is going to be affected by occurrence of the fault is transferred to another disk array enclosure in a different cluster. This has already been explained in detail in conjunction with FIG. 2, FIG. 3, and FIG. 4.

Figure 6:
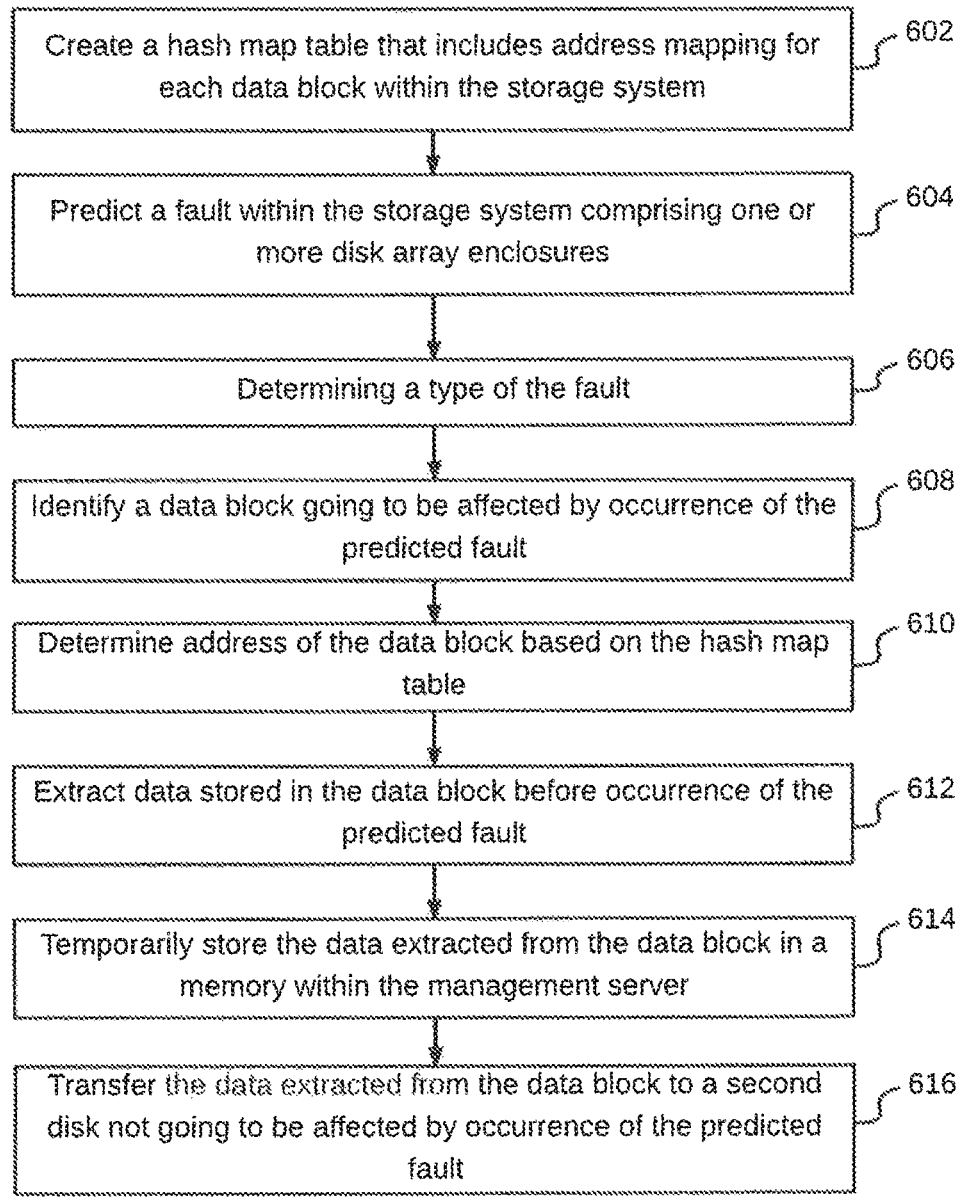
FIG. 6 illustrates a flowchart of a method of recovering data from a storage system using a management server, in accordance with an embodiment.

Referring now to FIG. 6, a flowchart of a method of recovering data from storage system 200 using management server 202 is illustrated, in accordance with an embodiment. At step 602, a hash map table that includes mapping of each data block within storage system 200 is created. In an embodiment, multiple hash map tables may be created, such that, each hash map table is associated with one disk array enclosure. Creation of hash map tables has already been explained in detail in conjunction with FIG. 3.

At step 604, a fault within storage system 200 is predicted and a type of the fault is then determined for the predicted fault at step 606. The type of fault may be determined by module handler 308. This has already been explained in detail in conjunction with FIG. 3. At step 608, based on the type of the fault, a data block that is going to be affected by occurrence of the predicted fault is identified. At step 610, address of the data block is determined based on the hash map table.

Based on the address determined for the data blocks, data is extracted from the data block before the occurrence of the predicted fault, at step 612. The data extracted from the data blocks is then temporarily stored within a memory (for example, memory 306) of management server 202. Thus, the memory in management server 202 also acts as a virtual disk and provides access to the extracted data, before it is transferred to a second disk. As a result, an end user never has to face any Data Unavailable (DU) or Data Lost (DL) situations.

After the fault has occurred and the data extracted has been saved from being damaged or lost, the data extracted from the data block is transferred to the second disk, at step 616. The first disk and the second disk may be located in different disk array enclosures and different clusters. By way of an example, data extracted from data blocks in disk 106-1 in disk array enclosure 102 of the first cluster is transferred to disk 108-1 in disk array enclosure 104 of the second cluster by management server 202. This has already been explained in detail in conjunction with FIG. 4. In an embodiment, when management server 202 is not capable of transferring data and when fault tolerance module 212 is located outside management server 202, fault tolerance module 212 may facilitate the transfer of data based on injection of one or more services of master routing module 214 in management server 202.

It will be apparent to a person skilled in the art that though steps 602-616 are performed for a single data block, these steps may be formed for multiple data blocks across multiple disks located within the same or different disk array enclosures or clusters in storage system 200.

Figure 7:
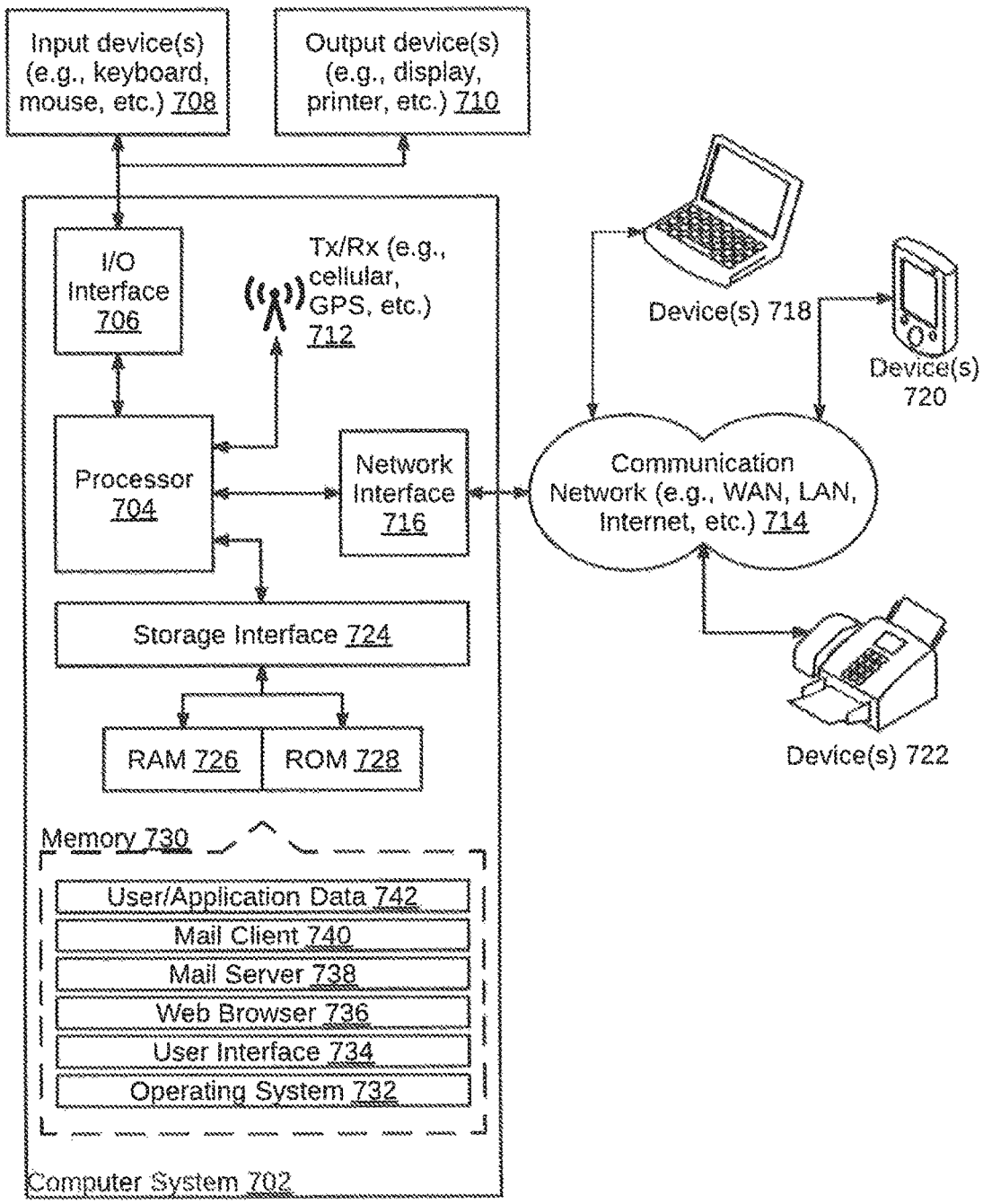
FIG. 7 illustrates a block diagram of an exemplary computer system for implementing various embodiments.

Referring now to FIG. 7, a block diagram of an exemplary computer system for implementing various embodiments is illustrated. Computer system 702 may include a central processing unit ("CPU" or "processor") 704. Processor 704 may include at least one data processor for executing program components for executing user-generated requests or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. The devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of the devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for recovering data from storage systems. The invention provides a fault detector and fault tolerance module that not only detects a fault or failure but rather predicts and determines the type as well as location of the fault occurrence in the storage system. As a result, data can be extracted any time ahead of hardware or software failure. This reduces requirement of storage space to act as backup and increases the performance. Moreover, the fault tolerance technique works on extracting data at the level of data blocks and thus operates in very less time and is easy to handle. As a result of the invention, there would be no more requirement of any secondary power device or a backup device.

The specification has described method and system for recovering data from storage systems. The illustrated steps are set out to explain the exemplary embodiments shown, and it should be anticipated that ongoing technological development will change the manner in which particular functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of recovering data from a storage system, the method comprising:

predicting, by a fault tolerance device, a fault within the storage system comprising one or more disk array enclosures, wherein each of the one or more disk array enclosures comprise a plurality of disks;

identifying, by the fault tolerance device, a data block going to be affected by occurrence of the predicted fault, wherein the data block is identified within a first disk in the plurality of disks;

creating, by the fault tolerance device, a hash map table comprising address mapping for each data block within the storage system, wherein address mapping for a data block within the storage system comprises memory address of the data block within a disk and identification of each of: the disk, a disk array enclosure comprising the disk, and a disk cluster comprising the disk array enclosure;

extracting, by the fault tolerance device, data stored in the data block before occurrence of the predicted fault based on the created hash map table; and transferring, by the fault tolerance device, the data extracted from the data block to a second disk not going to be affected by occurrence of the predicted fault.

2. The method of claim 1, further comprising determining address of the data block going to be affected by occurrence of the predicted fault based on the hash map table.

3. The method of claim 2, wherein the data stored in the data block is extracted based on the determined address of the data block.

4. The method of claim 1 further comprising determining a type of the fault in order to identify the data block going to be affected by occurrence of the predicted fault.

5. The method of claim 1, wherein the first disk is within a first disk array enclosure from the one or more disk array enclosures and the second disk is within a second disk array enclosure from the one or more disk array enclosures.

6. The method of claim 5, wherein a management server enables transfer of the data in the data block within the first disk array enclosure to the second disk within the second disk array enclosure.

7. The method of claim 6 further comprising temporarily storing the data extracted from the data block in a memory within the management server before transferring to the second disk.

8. The method of claim 6, wherein when the management server is not capable of transferring the data, a fault tolerance module facilitates the transfer of data based on injection of one or more services of a master routing module in the management server.

9. A storage system comprising:
one or more disk array enclosures, wherein each of the one or more disk array enclosures comprises a plurality of disks; and
at least one controller communicatively coupled to the one or more disk array enclosures, wherein the at least one controller is configured to:
predict a fault within the storage system comprising one or more disk array enclosures, wherein each of the one or more disk array enclosures comprise a plurality of disks;
identify a data block going to be affected by occurrence of the predicted fault, wherein the data block is identified within a first disk in the plurality of disks;
create a hash map table comprising address mapping for each data block within the storage system, wherein address mapping for a data block within the storage system comprises memory address of the data block within a disk and identification of each of: the disk, a disk array enclosure comprising the disk, and a disk cluster comprising the disk array enclosure;
extract data stored in the data block before occurrence of the predicted fault based on the created hash map table; and
transfer the data extracted from the data block to a second disk not going to be affected by occurrence of the predicted fault.

10. The storage system of claim 9, wherein the at least one controller is further configured to determine address of the data block going to be affected by occurrence of the predicted fault based on the hash map table.

11. The storage system of claim 10, wherein the data stored in the data block is extracted based on the determined address of the data block.

12. The storage system of claim 9, wherein the at least one controller is further configured to determine a type of the fault in order to identify the data block going to be affected by occurrence of the predicted fault.

13. The storage system of claim 9, wherein the first disk is within a first disk array enclosure from the one or more disk array enclosures and the second disk is within a second disk array enclosure from the one or more disk array enclosures.

14. The storage system of claim 13, wherein a management server enables transfer of the data in the data block within the first disk array enclosure to the second disk within the second disk array enclosure.

15. The storage system of claim 14, wherein the controller is further configured to temporarily store the data extracted from the data block in a memory within the management server before transferring to the second disk.

16. The storage system of claim 14, wherein when the management server is not capable of transferring the data, a fault tolerance module is configured to facilitate the transfer of data based on injection of one or more services of a master routing module in the management server.

17. A management server for recovering data in a storage system, the disk management server comprising:
a processor;
a memory communicatively coupled to the processor and having instructions stored thereon, causing the processor, on execution to:
predict a fault within the storage system comprising one or more disk array enclosures, wherein each of the one or more disk array enclosures comprise a plurality of disks;
identify a data block going to be affected by occurrence of the predicted fault, wherein the data block is identified within a first disk in the plurality of disks;
create a hash map table comprising address mapping for each data block within the storage system, wherein address mapping for a data block within the storage system comprises memory address of the data block within a disk and identification of each of: the disk, a disk array enclosure comprising the disk, and a disk cluster comprising the disk array enclosure;
extract data stored in the data block before occurrence of the predicted fault based on the created hash map table; and
transfer the data extracted from the data block to a second disk not going to be affected by occurrence of the predicted fault.

18. A non-transitory computer-readable storage medium having stored thereon, a set of computer-executable instructions causing a storage device comprising one or more processors to perform steps comprising:
predicting a fault within the storage system comprising one or more disk array enclosures, wherein each of the one or more disk array enclosures comprise a plurality of disks;
identifying a data block going to be affected by occurrence of the predicted fault, wherein the data block is identified within a first disk in the plurality of disks;
creating a hash map table comprising address mapping for each data block within the storage system, wherein address mapping for a data block within the storage system comprises memory address of the data block within a disk and identification of each of: the disk, a disk array enclosure comprising the disk, and a disk cluster comprising the disk array enclosure;

extracting data stored in the data block before occurrence of the predicted fault based on the created hash map table; and transferring the data extracted from the data block to a second disk not going to be affected by occurrence of the predicted fault.

* * * * *